United States Patent
Hongawa et al.

(10) Patent No.: US 8,411,386 B2
(45) Date of Patent: Apr. 2, 2013

(54) DATA WRITE CONTROL APPARATUS AND DATA WRITE CONTROL METHOD

(75) Inventors: Tadashi Hongawa, Ome (JP); Hideaki Tanaka, Kawasaki (JP); Tatsuo Nitta, Ome (JP); Tatsuya Haga, Ome (JP); Takahiro Shinbori, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/107,642

(22) Filed: May 13, 2011

(65) Prior Publication Data

US 2011/0292536 A1    Dec. 1, 2011

(30) Foreign Application Priority Data

May 31, 2010  (JP) .................................. 2010-125296

(51) Int. Cl.
*G11B 5/02* (2006.01)
*G11B 19/04* (2006.01)
(52) U.S. Cl. .................. 360/55; 360/60; 714/2; 714/42
(58) Field of Classification Search .......................... None
See application file for complete search history.

(56) References Cited

U.S. PATENT DOCUMENTS

2005/0180267 A1*   8/2005  Jeong et al. ..................... 368/96
2008/0174905 A1*   7/2008  Ueda ........................... 360/77.04

FOREIGN PATENT DOCUMENTS

| JP | 04-360069 | 12/1992 |
|---|---|---|
| JP | 9-163293 | 6/1997 |
| JP | 2000-021092 | 1/2000 |
| JP | 2000-293963 | 10/2000 |
| JP | 2006-338739 | 12/2006 |
| JP | 2007-073138 | 3/2007 |
| JP | 2008-021351 | 1/2008 |
| WO | WO-2009-050765 | 4/2009 |

OTHER PUBLICATIONS

Japanese Office Action dated Jul. 12, 2011, filed in Japanese counterpart Application No. 2010-125296, 6 pages (with English translation).
Japanese Office Action dated Oct. 11, 2011, filed in Japanese counterpart Application No. 2010-125296, 6 pages (with English translation).

* cited by examiner

*Primary Examiner* — Andrew L Sniezek
(74) *Attorney, Agent, or Firm* — Patterson & Sheridan, LLP

(57) ABSTRACT

According to one embodiment, a data write control apparatus includes a magnetic disk, a write controller, and a retry controller. The magnetic disk includes a track in which data is recorded in sector unit. The write controller is configured to execute control to write a sector data block to a predetermined sector in the track. The retry controller is configured to execute control to retry a write process to a predetermined number of sectors to which data has been written and which include a first sector, and to manage the number of retries performed on each sector.

14 Claims, 7 Drawing Sheets

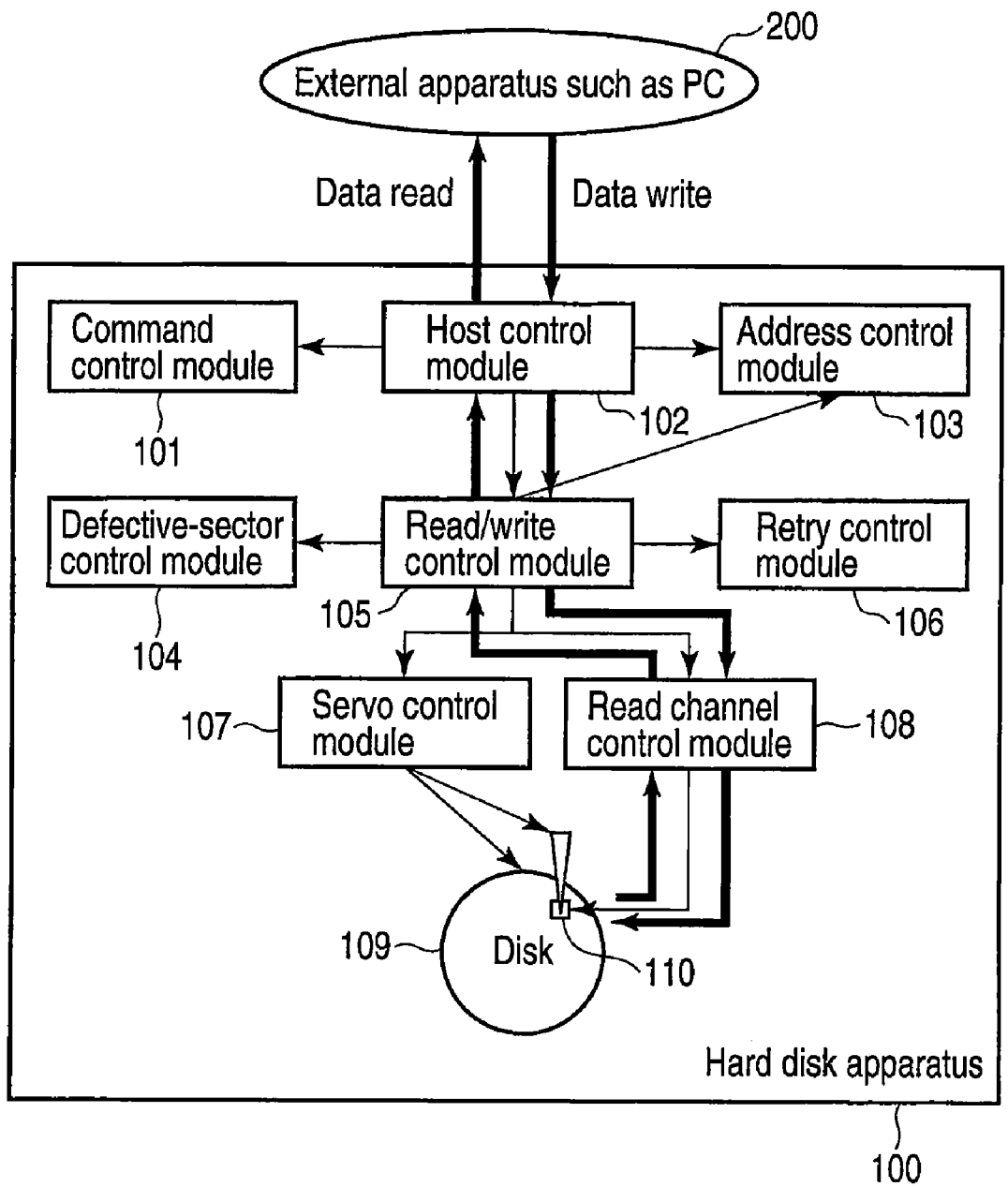
F I G. 1

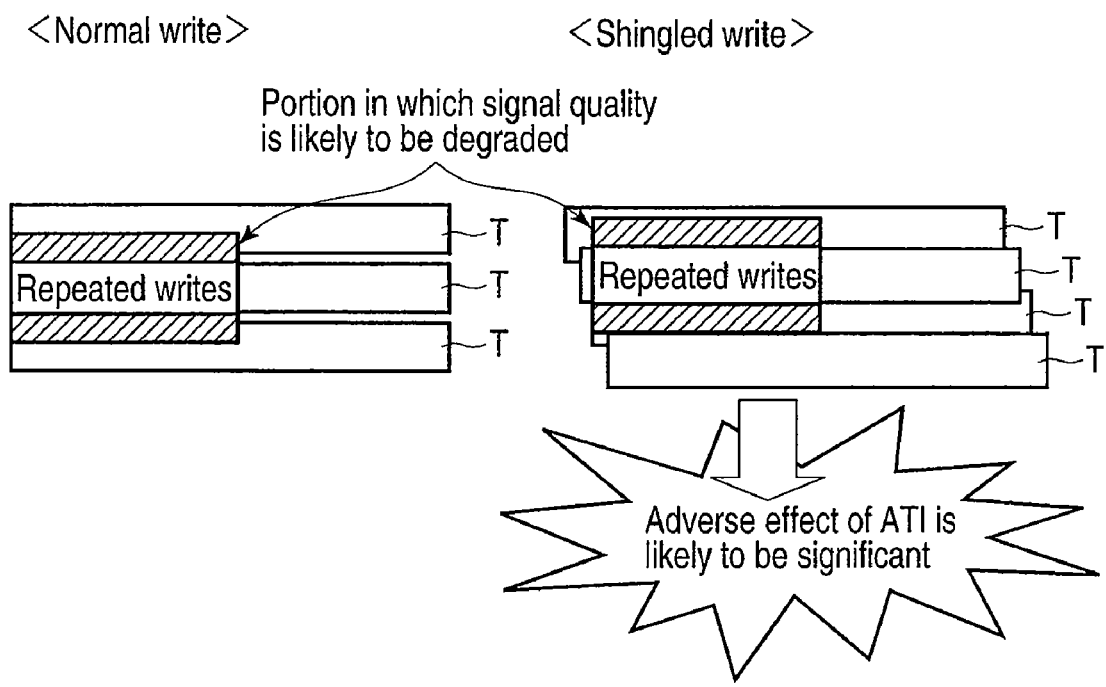
F I G. 2

| Acceleration | Remaining amount of slip/replacement area | | | |
|---|---|---|---|---|
| | At least 80% | At least 50% | At least 20% | Less than 20% |
| 0.0G | Start | Start | Start | Start |
| Less than 1.0G | Start | Start | Start | Stop |
| Less than 2.0G | Start | Start | Stop | Stop |
| Less than 3.0G | Start | Stop | Stop | Stop |
| At least 3.0G | Stop | Stop | Stop | Stop |

DATA WRITE CONTROL APPARATUS AND DATA WRITE CONTROL METHOD

CROSS-REFERENCE TO RELATED APPLICATIONS

This application is based upon and claims the benefit of priority from Japanese Patent Application No. 2010-125296, filed May 31, 2010; the entire contents of which are incorporated herein by reference.

FIELD

Embodiments described herein relate generally to a data write control apparatus and a data write control method.

BACKGROUND

Disk storage devices are known which use magnetic recording media represented by hard disk drives (HDD). The storage capacities of disk storage devices have been increasing year by year. In connection with this, the density of tracks in disks has increased, and the adverse effect of (Adjacent Track Interference) has been more and more significant.

For example, when data is written to a target track in a disk, a magnetic field leaking from the target track may destroy data in a track located adjacent to the target track.

Furthermore, in recent years, research and development has been promoted for shingled write recording, which is excellent in enabling an increase in the density of tracks. The shingled write recording is a scheme in which data is written such that relevant tracks partly overlap. That is, no gap is created between the tracks, thus making the adverse effect of ATI much more significant.

When tracks are more densely formed in order to increase storage capacity, errors occur more frequently. For example, data is written to tracks in units of sectors, and if a read of data written to a certain sector fails, this particular sector is managed as a defective sector. The defective sector is excluded from the subsequent data write target. Frequent occurrence of defective sectors may reduce the storage capacity.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a diagram showing an example of an information processing system common to a first embodiment to a third embodiment;

FIG. 2 is a diagram showing an example of a normal write scheme and a shingled write recording scheme which are common to the first embodiment to a fourth embodiment;

DETAILED DESCRIPTION

Figure 3:
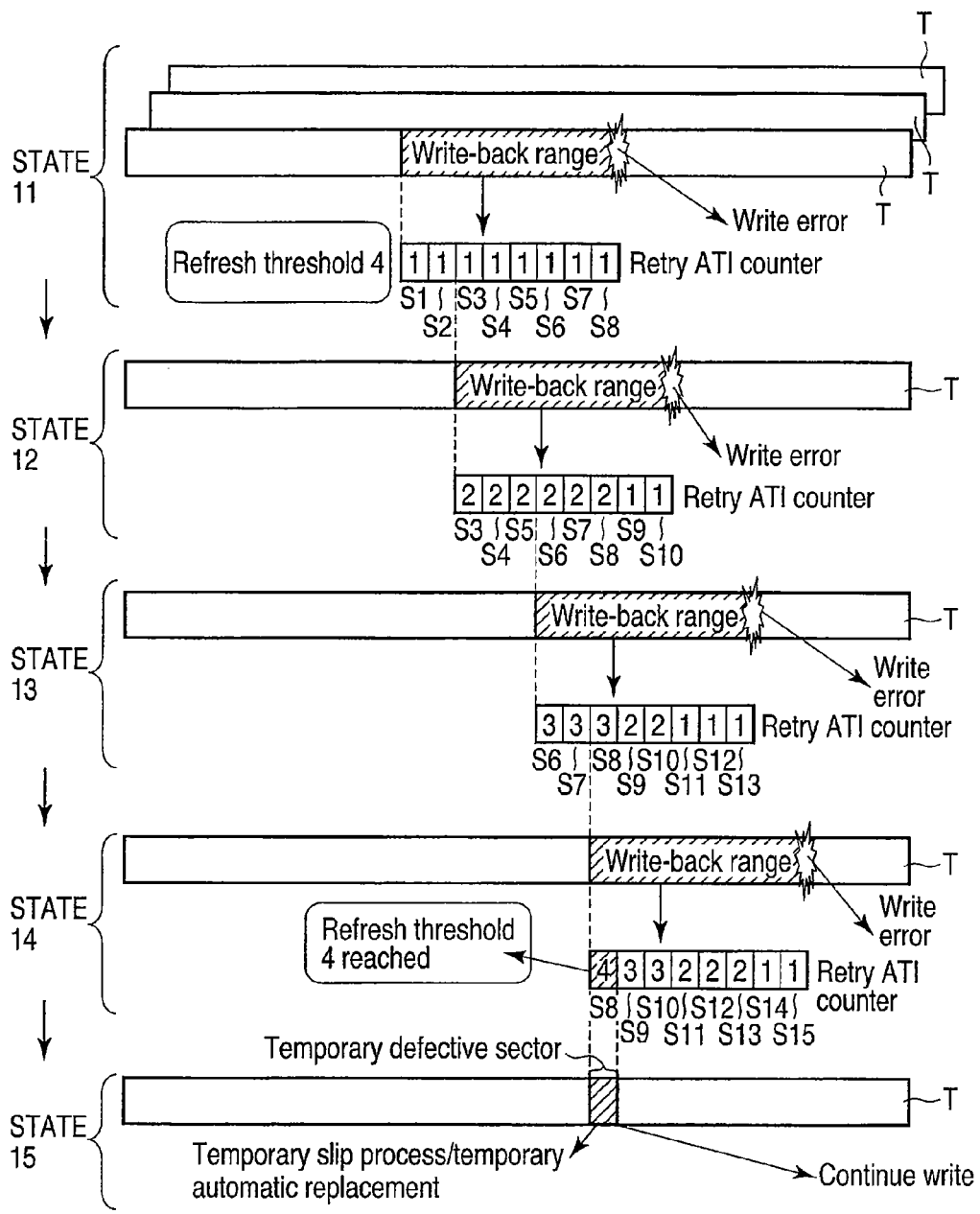
FIG. 3 is a diagram showing an example of a write-back scheme based on a retry ARI counter according to the first embodiment.

Various embodiments will be described hereinafter with reference to the accompanying drawings.

In general, according to one embodiment, a data write control apparatus includes a magnetic disk, a write controller, and a retry controller. The magnetic disk includes a track in which data is recorded in sector unit. The write controller is configured to execute control to write a sector data block to a predetermined sector in the track. The retry controller is configured to execute control to retry a write process to a predetermined number of sectors to which data has been written and which include a first sector, and to manage the number of retries performed on each sector.

A first embodiment to a fourth embodiment will be described with reference to the drawings.

FIG. 1 is a diagram showing an example of an information processing system common to the first to third embodiments. As shown in FIG. 1, the information processing system comprises a hard disk apparatus (data write control apparatus) 100 and an external apparatus 200 such as PC.

For example, the hard disk apparatus 100 is configured to be capable of being installed in and removed from the external apparatus 200. The hard disk apparatus 100 connected to the external apparatus 200 writes write data transferred by the external apparatus 200 to a disk 109 based on an instruction from the external apparatus 200. Furthermore, the hard disk apparatus 100 connected to the external apparatus 200 reads data from the disk 109 and transfers the read data to the external apparatus 200 based on an instruction from the external apparatus 200.

As shown in FIG. 1, the hard disk apparatus 100 comprises a command control module 101, a host control module 102, an address control module 103, a defective-sector control module 104, a read/write control module 105, a retry control module 106, a servo control module 107, a read channel control module 108, the disk 109, and a head 110. The operation of each of the modules will be sequentially described below.

For example, the hard disk 100 can write data to the disk 109 based on a shingled write recording scheme. The hard disk apparatus 100 can also write data to the disk 109 based on a normal write scheme. As shown in FIG. 2, according to the normal write scheme, adjacent data tracks T are written onto the disk 109 without overlapping. In contrast, according to the shingled write scheme, the adjacent data tracks T are written onto the disk 109 so as to partly overlap.

In the shingled write scheme, no gap is created between the adjacent data tracks T. Thus, the adverse effect of ATI is likely to be more significant. In such a situation, the hard disk apparatus 100 can efficiently write data based on a combination of at least one of the following schemes.

Write-back scheme based on a retry ATI counter described in the first embodiment Defective-sector management scheme based on a temporary slip management table described in the second embodiment Defective-sector management scheme based on a temporary automatic replacement management table described in the third embodiment The hard disk drive 100 also supports the normal write scheme as described above, and can efficiently write data using a combination of at least one of the above-described schemes, even according to the normal write scheme.

(First Embodiment)

[Write-Back Scheme Based on a Retry ATI Counter]

FIG. 3 is a diagram showing an example of the write-back scheme based on the retry ARI counter.

For example, the external apparatus 200 issues a write command and transmits write data. The host control module 102 of the hard disk apparatus 100 receives a write command and write data. The command control module 101 analyzes the received write command. The read/write control module 105 controls write of the write data based on the analyzed write command. The servo control module 107 controls servos such as VCM and spindle motor (none of which are shown in the drawings). The write data is written to the disk 109 via the head 110 under the control of the read channel control module 108.

Here, the relationship between the data tracks T and sectors and sector data blocks. For example, as shown in FIG. 3, a plurality of the data tracks T are written to the disk 109 so as to partly overlap. Data corresponding to one sector (that is, data written to one sector) is defined as one sector data block. Then, each data track T is configured to be capable of containing a plurality of sectors (or a plurality of sector data blocks). The data corresponding to one sector (that is, one sector data block) is the minimum write unit, and is, for example, 512-byte data. Furthermore, the sectors may be long sectors. Data corresponding to a long sector (that is, one sector data block) is, for example, 4-Kbyte data.

The hard disk apparatus 100 (read/write control module 105 and other components) executes control to write a plurality of sector data blocks to the first data track T (or a plurality of sectors contained in the first data track T) in order. Subsequently, the hard disk apparatus 100 executes control to write a plurality of sector data blocks to the second data track T partly overlapping the first data track T (or a plurality of sectors contained in the second data track T).

The servo control module 107 or the read channel control module 108 can monitor a data write status. For example, with a data write to the first data track controlled, the servo control module 107 or the read channel control module 108 can detect write errors in data writes to the data tracks other than the first data track T (other than the target data track). That is, the servo control module 107 or the read channel control module 108 can detect errors in the write of a predetermined sector data block to the first data track T (predetermined sector).

In response to detection of a write error, for example, the retry control module 106 executes control to retry a process of writing a predetermined number of sector data blocks to a predetermined number of sectors (write-back range) including a predetermined sector (write error sector) and to which data has been written. In response to this, the read/write control module 105 writes a predetermined number of sector data blocks starting from a position specified by the address control module. The retry control module 106 comprises and allows a retry ATI counter to count (manage) the number of retries of write of each sector (predetermined number of sectors).

For example, if the retry control module 106 specifies eight sectors (sectors S1 to S8) as a write-back range, then as shown in STATE11 in FIG. 3, the retry control module 106 executes control to retry a process of writing 8 sector data blocks including a sector S8 (write error sector) and to which data has been written. In response to this, the read/write control module 105 writes 8 sector data blocks starting from a position (sector S1) specified by the address control module. Moreover, the retry control module 106 allows the retry ATI counter to count up the retry count (+1) for sectors S1 to S8 (see STATE11 in FIG. 3).

Furthermore, when a write error is detected in sectors S9 to S15 arranged close to sector S8, write-back ranges overlap. For example, upon detecting a write error in sector S8, the retry control module 106 executes control to retry a write process to sectors S1 to S8 (first write-back range). In response to this, the read/write control module 105 writes 8 sector data blocks starting from a position (sector S1) specified by the address control module. Moreover, the retry control module 106 allows the retry ATI counter to count up the retry count (+1) for sectors S1 to S8 (see STATE11 in FIG. 3).

Furthermore, upon detecting a write error in sector S10, the retry control module 106 executes control to retry a write process to sectors S3 to S10 (second write-back range). In response to this, the read/write control module 105 writes 8 sector data blocks starting from a position (sector S3) specified by the address control module. Moreover, the retry control module 106 allows the retry ATI counter to count up the number of retries (+1) for sectors S3 to S10 (see STATE12 in FIG. 3).

As described above, the first write-back range and the second write-back range partly overlap. When a write-back process results in overlapping write-back ranges, errors are likely to occur as a result of ATI or the like. The shingled write scheme is affected by ATI or the like more significantly than the normal write scheme. The hard disk apparatus 100 can carry out a refresh process in order to reduce errors resulting from ATI or the like. In the refresh process according to the shingled write scheme, data is rewritten in predetermined write unit (a unit for a plurality of data tracks (hereinafter referred to as a roof unit)). In other words, the shingled write scheme adopts the form in which tracks are written so as to partly overlap. Thus, in the shingled write scheme, partly rewriting data is difficult, and rewrite is performed in roof unit. Also in connection with this, the performance of the hard disk apparatus 100 may be degraded in association with the frequent execution of a plurality of refresh processes.

The hard disk apparatus 100 (retry control module 106) allows the retry ATI counter to count (manage) the number of retries performed on each sector (a predetermined number of sectors) as described above, thus enabling a reduction in refresh processes.

For example, the retry control module 106 holds a refresh threshold (for example, a refresh threshold 4). The refresh threshold corresponds to the number of writes for which the refresh process is desired.

Furthermore, after STATE11 and STATE12, upon detecting a write error in sector S13, the retry control module 106 executes control to retry a write process to sectors S6 to S13 (third write-back range). In response to this, the read/write control module 105 writes 8 sector data blocks starting from a position (sector S6) specified by the address control module. Moreover, the retry control module 106 allows the retry ATI counter to count up the number of retries (+1) for sectors S6 to S13 (see STATE13 in FIG. 3).

Furthermore, upon detecting a write error in sector S15, the retry control module 106 executes control to a write process to sectors S8 to S15 (fourth write-back range). In response to this, the read/write control module 105 writes 8 sector data blocks starting from a position (sector S8) specified by the address control module. Moreover, the retry control module 106 allows the retry ATI counter to count up the number of retries (+1) for sectors S8 to S15 (see STATE14 in FIG. 3).

The retry control module 106 constantly compares the refresh threshold with the count value in the retry ATI counter to determine whether or not the refresh process needs to be carried out. In the case of the above-described STATE11 to STATE13, the retry control module 106 determines that the refresh process need not be carried out.

In contrast, in the case of the above-described STATE14, the count value (4) in the retry ATI counter corresponding to sector S8 is equal to the fresh threshold (4). Thus, the retry control module 106 determines sector S8 to be a temporary defective sector to further determine that a further write to sector S8 results in the need for the refresh process.

That is, the retry control module 106 can detect a temporary defective sector (for example, sector S8) and normal sectors (for example, sectors S1 to S7, S9 to S15) in the plurality of sectors based on the count value in the retry ATI counter. The defective-sector control module 104 temporarily excludes the temporary defective sector from the write process targets. Furthermore, the defective-sector control module 104 sets the temporary defective sector to be a target for a temporary slip process or a temporary replacement process, and controls the execution of the temporary slip process or temporary replacement process.

Thus, the read/write control module 105 continues the write process with the temporary defective sector skipped. For example, in the write-back process, the read/write control module 105 executes control to resume the write process of writing the unrecorded ones of the sector data blocks are written in order starting with the normal sector succeeding the temporary defective sector.

As described above, the hard disk apparatus 100 enables a reduction in the frequency of refresh processes in the shingled write scheme. This allows a decrease in processing efficiency to be prevented.

(Second Embodiment)
[Defective-Sector Management Scheme Based on the Temporary Slip Management Table]

As described above, in the shingled write scheme, since the adverse effect of ATI is significant, the number of retries is desirably reduced. Thus, as described in the first embodiment, the hard disk apparatus 100 registers, at an early stage, a sector having caused an error as a temporary defective sector. That is, the hard disk apparatus 100 registers a sector (normally usable sector) to be rescued by the normal write scheme, as a temporary defective sector according to the shingled write scheme. Then, if the temporary defective sector meets predetermined conditions, the hard disk apparatus 100 recovers the temporary defective sector to a normal sector. This prevents a slip area from being depleted (exhausted) and allows a reduction in the need to carry out a temporary replacement process (generation of a replacement sector) described below.

Figure 4:
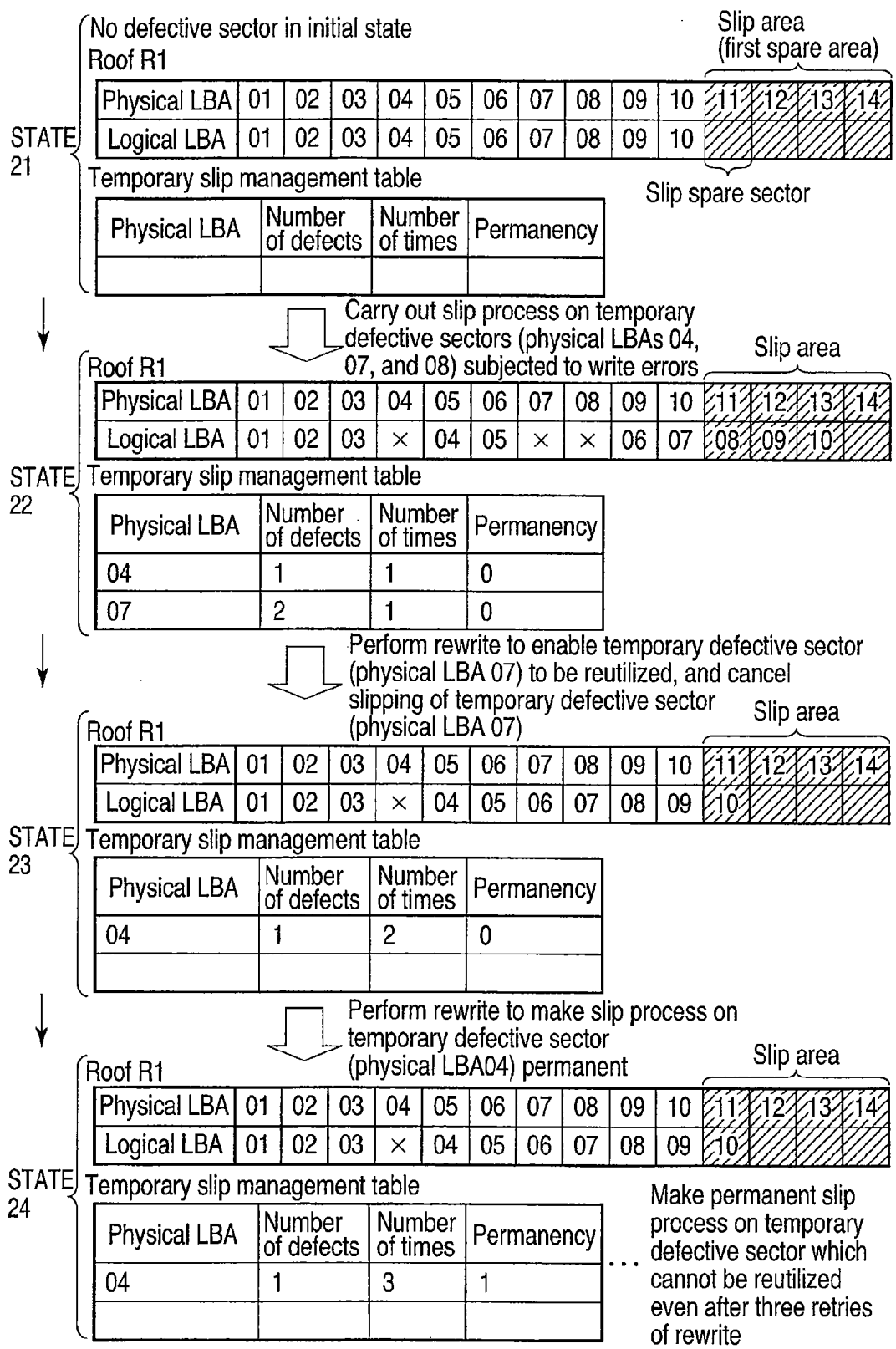
FIG. 4 is a diagram showing an example of a defective-sector management scheme based on a temporary slip management table according to the second embodiment.

The defective-sector control module 104 manages temporary defective sectors based on the temporary slip management table. As shown in FIG. 4, for example, physical LBAs 01 to 14 are assumed to be a roof R1. Physical LBAs 11 to 14 (slip spare sector) are assumed to be a slip area (first spare area). One physical LBA (logical LBA) corresponds to one sector (one sector data block).

In the initial state, no temporary defective sector is present (see STATE21 in FIG. 4).

For example, when the retry control module 106 detects physical LBAs 04, 07, and 08 as temporary defective sectors, the defective-sector control module 104 temporarily excludes these temporary defective sectors from the write process targets. The defective-sector control module 104 sets the temporary defective sectors to be temporary slip process targets, and controls execution of the temporary slip process. Thus, as shown in STATE22 in FIG. 4, the defective-sector control module 104 associates physical LBAs 01 to 03, 05, 06, and 09 to 13 with logical LBAs 01 to 10 to update the temporary slip management table. That is, the temporary slip management table is used to manage the temporary defective sectors (physical LBAs 04, 07, and 08) so that with the temporary defective sectors slipped, data is written to the normal sectors (physical LBAs 01 to 03, 05, 06, and 09 to 13). Furthermore, the temporary slip management table manages the number of write trials (1) carried out on the temporary defective sectors (physical LBAs 04, 07, and 08).

For example, in response to an instruction to rewrite the roof R1, the read/write control module 105 attempts o reuse the temporary defective sectors registered in the temporary slip management table. For example, as shown in STATE23, if the temporary defective sectors (physical LBAs 07 and 08) are reused, that is, if data can normally be written to the temporary defective sectors (physical LBAs 07 and 08), the defective-sector control module 104 updates the temporary slip management table to recover the temporary defective sectors (physical LBAs 07 and 08) to normal sectors. That is, the temporary slip management table is used to manage the temporary defective sector (physical LBA 04) so that with the temporary defective sector slipped, data is written to the normal sectors (physical LBAs 01 to 03, and 05 to 11). Furthermore, the number of write trials (2) carried out on the temporary defective sector (physical LBA 04) is managed.

Moreover, in response to an instruction to rewrite the roof R1, the read/write control module 105 attempts to reuse the temporary defective sectors registered in the temporary slip management table. The defective-sector control module 104 holds a defective-sector establishment threshold (for example, a defective-sector establishment threshold 3). For example, as shown in STATE24, if the temporary defective sector (physical LBA 04) cannot be reused, that is, if data cannot be written normally to the temporary defective sector (physical LBA 04), the defective-sector control module 104 updates the temporary slip management table. That is, the temporary slip management table is used to manage the temporary defective sector (physical LBA 04) so that with the temporary defective sector slipped, data is written to the normal sectors (physical LBAs 01 to 03, and 05 to 11). Furthermore, the number of write trials (3) carried out on the temporary defective sector (physical LBA 04) is managed.

Whenever performing a retry, the defective-sector control module 104 compares the defective-sector establishment threshold with the number of write trials in the temporary slip management table. The defective-sector control module 104 thus determines whether or not to establish the defective sector (to make the defective sector permanent). In the case of the above-described STATE22 and STATE23, the defective-sector control module 104 determines that the defective sector need not be established.

In contrast, in the case of the above-described STATE24, the number of write trials (3) corresponding to the temporary defective sector (physical LBA04) has reached the defective-sector establishment threshold (3). In response to this, the defective-sector control module 104 sets a flag indicative of permanency for the temporary defective sector (physical LBA04) in the temporary slip management table. The defective-sector control module 104 then manages the temporary defective sector with the set flag as an established defective sector. Thus, the defective-sector control module 104 excludes the established defective sector (physical LBA04) from the rewrite (or write and rewrite) targets. Hence, even if an instruction to rewrite the roof R1 is given, no attempt to reuse the established defective sector (physical LBA04) is made. That is, the temporary defective sector is not a write target sector but is a rewrite target sector (a sector that may be recovered to a normal sector), whereas the established defective sector is not a rewrite target sector (or a write and rewrite target sector).

As described above, the hard disk apparatus 100 can prevent depletion (exhaustion) of the slip area in the shingled write scheme and further reduce the need to carry out a temporary replacement process (generate a replacement sector) described below. This allows a possible decrease in process efficiency to be prevented.

(Third Embodiment)
[Defective-Sector Management Scheme Based on the Temporary Automatic Replacement Management Table]

As described in the second embodiment, the temporary slip process is carried out on the roof R1 to allow physical LBAs 11 to 14 in the slip area in the roof R1 to be used. However, the slip area in the roof R1 may be depleted (exhausted) to preclude the temporary slip process from being carried out (see STATE31 in FIG. 5).

Figure 5:
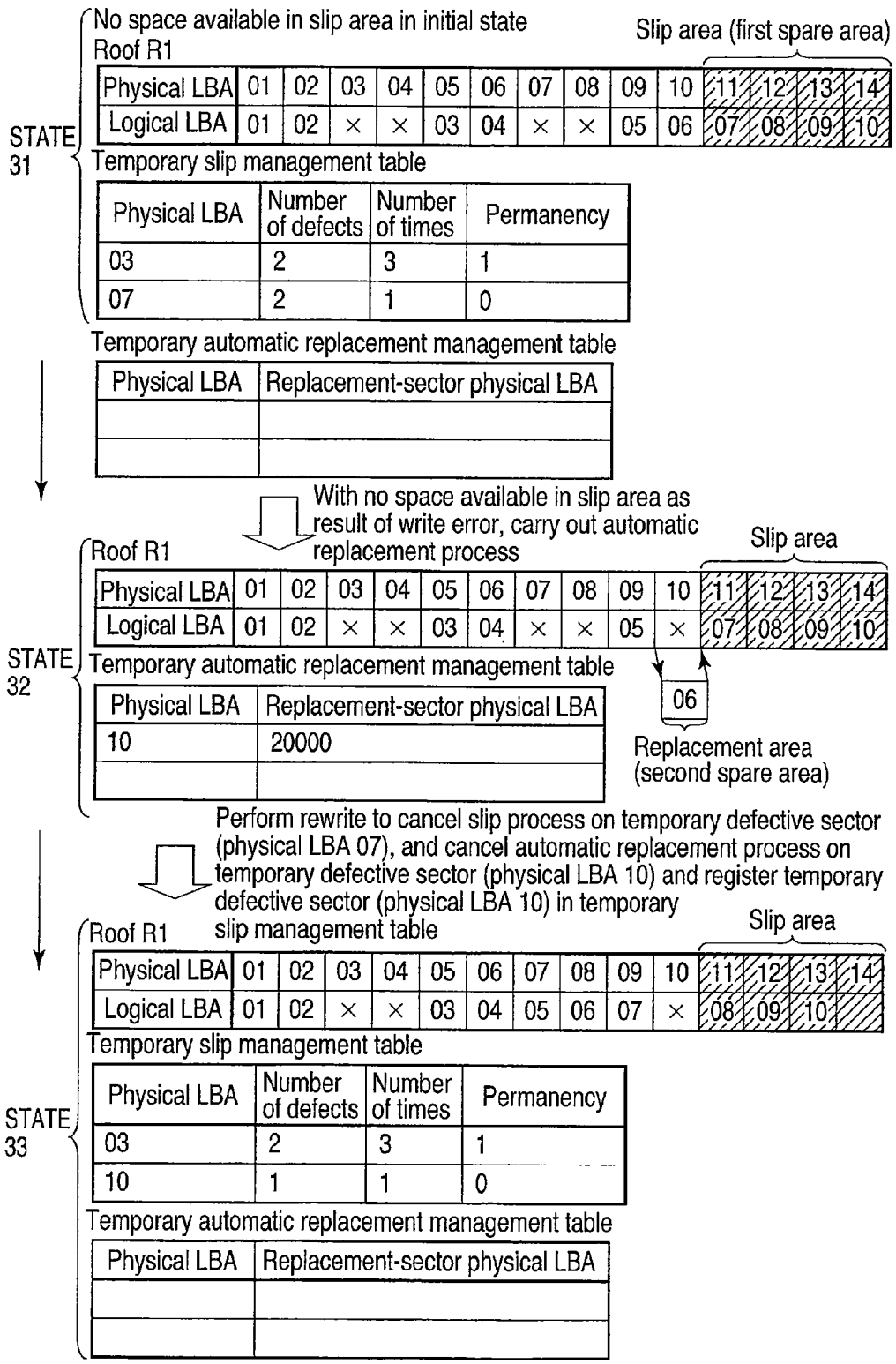
FIG. 5 is a diagram showing an example of a defective-sector management scheme based on a temporary automatic replacement management table according to the third embodiment.

If no space is available in the slip area in the roof R1, the defective-sector control module 104 uses a replacement area located outside the roof R1 (non-slip spare sector in a second spare area) to control execution of a temporary replacement process (see STATE32 in FIG. 5). For example, with no space available in the slip area in the roof R1, if a further temporary defective sector (physical LBA10) is detected, the defective-sector control module 104 manageably associates the temporary defective sector (physical LBA 10) with a replacement sector (physical LBA20000) based on the temporary automatic replacement management table. The read/write control module 105 writes data for which write has been attempted on the temporary defective sector (physical LBA10), to the replacement sector (physical LBA20000), based on the temporary automatic replacement management table. Similarly, the read/write control module 105 reads data for which read has been attempted on the temporary defective sector (physical LBA10), from the replacement sector (physical LBA 20000).

After the temporary replacement process is applied, an access to the replacement area located outside the roof R1 (second spare area) takes place, reducing access efficiency. Thus, the hard disk apparatus 100 temporarily uses the replacement area, and if predetermined conditions are met, avoids using the replacement area, allowing a possible decrease in access efficiency to be prevented.

After STATE32, when a further instruction to rewrite the roof R1 is given, the read/write control module 105 attempts to reuse the temporary defective sector registered in the temporary slip management table. For example, if the temporary defective sectors (physical LBAs 07 and 08) can be reused as shown in STATE33 in FIG. 5, that is, since data can be normally written to the temporary defective sectors (physical LBAs 07 and 08), the defective-sector control module 104 updates the temporary slip management table to recover the temporary defective sectors (physical LBAs 07 and 08) to normal sectors. Thus, when the slip area in the roof R1 becomes available and all of the write target data can be written to the roof R1, the defective-sector control module 104 removes the association between the temporary defective sector (physical LBA10) registered in the temporary automatic replacement management table and the replacement sector (physical LBA20000). That is, the read/write control module 105 carries out the temporary slip process to write the write target data to the roof R1 without applying the temporary replacement process.

Thus, even if the temporary replacement process is applied, data can be written or read without the need to apply the temporary replacement process again. This allows a possible decrease in access efficiency to be prevented. As described above, the hard disk apparatus 100 can reduce the need to carry out the temporary replacement process in the shingled write scheme, thus preventing a possible decrease in processing efficiency.

(Fourth Embodiment)
[Vibrating State Retry Processing Scheme]

Figure 6:
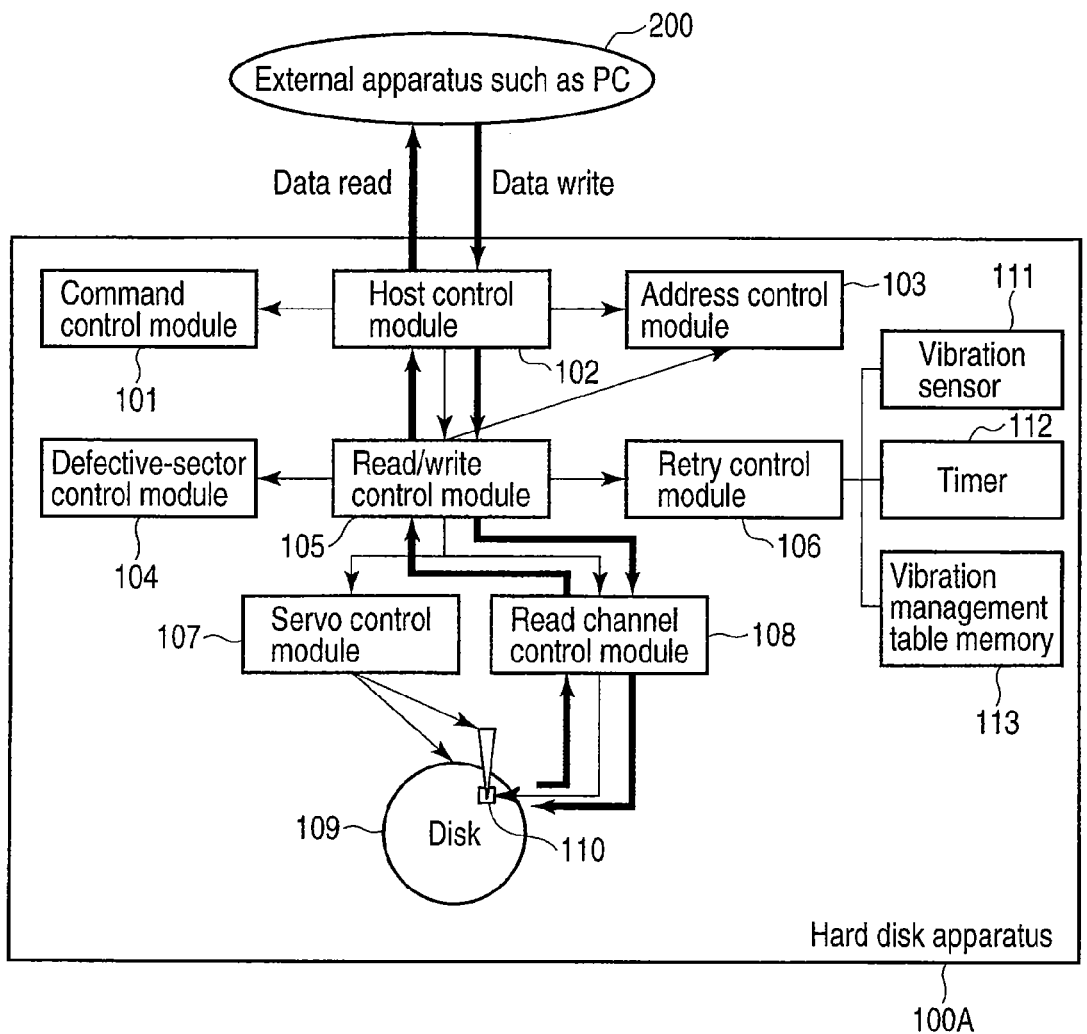
FIG. 6 is a diagram showing an example of an information processing system according to the fourth embodiment.

FIG. 6 is a diagram showing an example of an information processing system according to a fourth embodiment. The information processing system according to the fourth embodiment includes the configuration of the information processing system shown in FIG. 1. Moreover, a hard disk apparatus 100A forming the information processing system according to the fourth embodiment comprises a vibration sensor 111, a timer 112, and a vibration management table memory 113. The hard disk apparatus 100A according to the fourth embodiment can efficiently write data based on a combination of the first, second, and third embodiments. The hard disk apparatus 100 supports the normal write scheme and the shingled write scheme as described above. A vibrating state retry processing scheme according to the fourth embodiment is applicable both to the normal write scheme and to the shingled write scheme.

If vibration is being transmitted to the hard disk apparatus 100A, write errors are likely to occur. In such a situation in which errors are likely to occur, it is difficult to recover from the error even with the retry process. Thus, the retry process is inefficient. In other words, carrying out the retry process in the above-described situation is likely to result in execution of an unwanted temporary slip process or temporary replacement process. Furthermore, carrying out the retry process in the above-described situation is prone to cause the slip area or replacement area to be depleted. The exhaustion of the slip area results in the need to carry out a replacement process, thus reducing processing efficiency. Furthermore, if even the replacement area is exhausted, performing data write or read may be impossible.

Figures 7, 8:
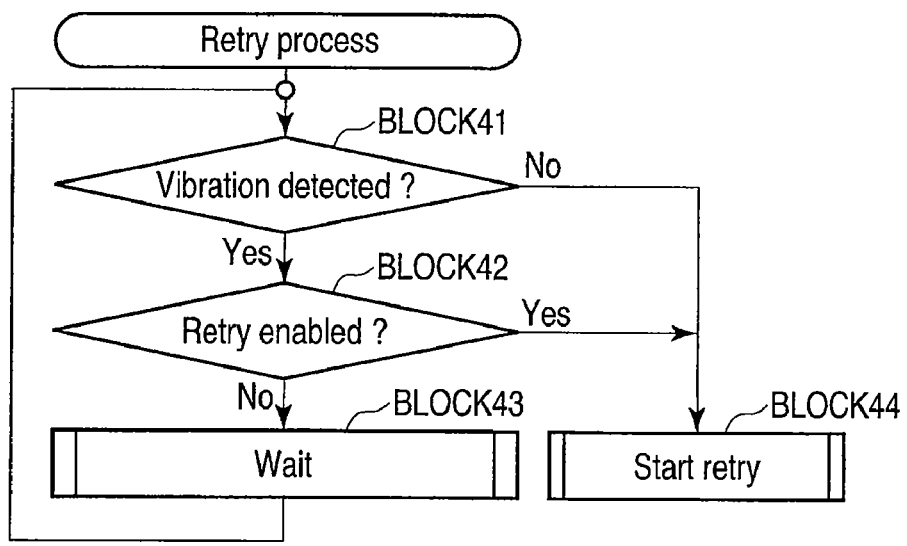
FIG. 7 is a diagram showing an example of a vibration management table according to the fourth embodiment.
FIG. 8 is a flowchart showing an example of a vibrating-state retry processing scheme according to the fourth embodiment.

The hard disk apparatus 100A according to the fourth embodiment can avoid such problems as described above to efficiently write data. For example, the vibration sensor 111 of the hard disk apparatus 100A detects vibration to measure the vibration level (acceleration) of the detected vibration. The timer 112 counts the time elapsed since the detection of vibration by the vibration sensor 111. The vibration management table memory 113 is configured to store a vibration management table. As shown in FIG. 7, the vibration management table contains information indicating whether or not to perform a retry based on the vibration level (acceleration) and the remaining amount of the slip area and replacement area. The defective-sector control module 104 controls the execution of the temporary slip process and the temporary replacement process. For example, the defective-sector control module 104 manages the remaining amount of the slip area and replacement area.

FIG. 8 is a flowchart showing an example of a vibrating state retry processing scheme. For example, the retry control module 106 controls the execution of a retry process based on a retry instruction. The retry control module 106 controls the execution of a retry after determining whether or not to be able to perform the retry as described below. Alternatively, even during the execution of a retry process, the retry control module 106 controls the continuation of the retry after determining whether or not the retry can be continued as described below.

When the vibration sensor 111 detects vibration (BLOCK41, YES), the retry control module 106 references the vibration management table to determine whether or not to be able to perform a retry based on the vibration level (acceleration) detected by the vibration sensor 111 and the remaining amount of the slip area and replacement area. Alternatively, the retry control module 106 references the vibration management table to determine whether or not to be able to continue the retry based on the vibration level (acceleration) detected by the vibration sensor 111 and the remaining amount of the slip area and replacement area.

For example, if the vibration level (acceleration) is lower than 1.0 G and higher than 0.0 G, then provided that the remaining amount of the slip area and replacement area is at least 50% and less than 80%, the retry control module 106 determines that the retry can be performed (or the retry can be continued) (BLOCK42, YES). The retry control module 106 controls the execution of the retry (or the continuation of the retry) (BLOCK44).

Furthermore, if the vibration level (acceleration) is lower than 3.0 G and at least 2.0 G and the remaining amount of the slip area and replacement area is at least 50% and less than 80%, the retry control module 106 determines that the retry cannot be performed (or the retry cannot be continued) (BLOCK42, NO). The retry control module 106 references the elapsed time counted by the timer 112 to postpone the execution of the retry for a given time (or to suspend the execution of the retry for a given time) (BLOCK43).

The retry control module 106 may controllably perform (continue) the retry the given time later or may determine, the given time later, whether or not to be able to perform (continue) the retry and then control the execution (continuation) of the retry.

In the above description, the retry control module 106 determines whether or not to be able to perform (continue) a retry based on the vibration level (acceleration) and the remaining amount of the slip area and replacement area. However, the retry control module 106 may make determination as follows. For example, the retry control module 106 may determine whether or not to be able to perform (continue) the retry based on the vibration level (acceleration) and the remaining amount of the slip area. Alternatively, for example, the retry control module 106 may determine whether or not to be able to perform (continue) the retry based on the vibration level (acceleration) and the remaining amount of the replacement area.

As described above, the hard disk apparatus 100A (retry control module 106) can control a timing for performing (continuing) the retry in accordance with the intensity of the vibration and the remaining amount of the slip area and replacement area (or the remaining amount of the replacement area or the remaining amount of the slip area).

That is, the hard disk apparatus 100A can reduce the need to carry out the temporary slip process or temporary replacement process to prevent the slip area or replacement are from being excessively depleted.

The various modules of the embodiments described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data write control apparatus comprising:
a magnetic disk comprising a track having sectors in which data is recorded;
a write controller configured to execute control to write a sector data block to a predetermined sector in the track; and
a retry controller configured to execute control to retry a process of writing to a predetermined number of sectors including a first sector to which data has been written, according to an error in a process of writing a sector data block to the first sector, and to manage a number of retries performed on each sector,
wherein the write controller is configured to detect a first temporary defective sector based on the number of retries performed on each sector, and to exclude the first temporary defective sector from a target for the write process,
the write controller is further configured to execute control to rewrite a plurality of sector data blocks that have been requested for rewriting to a plurality of sectors according to a rewrite instruction, and
the retry controller is configured to recover the first temporary defective sector as a first normal sector, and include the first normal sector in the target for the write process when a rewrite to the first temporary defective sector is completed without an error, and to manage a number of rewrites to the first temporary defective sector with errors.

2. The apparatus of claim 1, wherein the write controller is configured to execute control to write the sector data block to a plurality of data tracks in such a manner that adjacent data tracks partly overlap.

3. The apparatus of claim 1, wherein the retry controller is configured to exclude the first temporary defective sector from the target for the write process and a target for the rewrite process based on the number of rewrites to the first temporary defective sector with errors.

4. The apparatus of claim 3, wherein the write controller is configured to execute control to write the sector data block to a plurality of data tracks in such a manner that adjacent data tracks partly overlap.

5. The apparatus of claim 3, wherein the write controller is configured to detect a normal sector in a plurality of sectors based on the number of retries performed on each sector, and to execute control to resume the write process of writing an unrecorded sector data block to the normal sector succeeding the first temporary defective sector,
the write controller is further configured to execute control to write a plurality of data blocks to the normal sector included in the plurality of sectors and a slip spare sector included in a first spare area succeeding the plurality of sectors, and
the write controller is further configured to execute control to write a second sector data block which is to be written to a second temporary defective sector to a non-slip spare sector included in a second spare area according to detection of the second temporary defective sector in the plurality of sectors after exhaustion of the slip spare sector.

6. The apparatus of claim 3, further comprising:
a vibration detector configured to detect vibration; and
a remaining amount detector configured to detect the remaining amount of the first spare area,
wherein the retry controller is configured to control the execution timing for the retry based on the vibration and the remaining amount,
the write controller is configured to detect a normal sector in a plurality of sectors based on the number of retries performed on each sector, and to execute control to resume the write process of writing an unrecorded sector data block to the normal sector succeeding the first temporary defective sector, and
the write controller is further configured to execute control to write a plurality of data blocks to the normal sector included in the plurality of sectors and a slip spare sector included in the first spare area succeeding the plurality of sectors.

7. The apparatus of claim 1, wherein the write controller is configured to detect a normal sector in a plurality of sectors based on the number of retries performed on each sector, and to execute control to resume the process of writing an unrecorded sector data block to the normal sector succeeding the first temporary defective sector,
the write controller is further configured to execute control to write a plurality of data blocks to the normal sectors included in the plurality of sectors and a slip spare sector included in a first spare area succeeding the plurality of sectors, and
the write controller is further configured to execute control to write a second sector data block which is to be written to a second temporary defective sector to a non-slip spare sector included in a second spare area according to detection of the second temporary defective sector in the plurality of sectors after exhaustion of the slip spare sector.

8. The apparatus of claim 7, wherein the write controller is configured to execute control to rewrite a plurality of sector data blocks including the second sector data block to a continuous area comprising the plurality of sectors including the first and second temporary defective sectors and the slip spare sector according to a rewrite instruction given after the second sector data block has been written to the non-slip spare sector, and to execute control to leave the second sector data block in the continuous area when a normal data write to at least one of the first and second temporary defective sectors is successful.

9. The apparatus of claim 8, wherein the retry controller is configured to manage the first temporary defective sector as the first normal sector when a data write to the first temporary defective sector is completed without errors, to recover the first normal sector to the target for the write process, to manage the second temporary defective sector as a second normal sector when a data write to the second temporary defective sector is completed without errors, and to recover the second normal sector to the target for the write process.

10. The apparatus of claim 7, further comprising:
a vibration detector configured to detect vibration; and
a remaining amount detector configured to detect a remaining amount of the first spare area,
wherein the retry controller is configured to control the execution timing for the retry based on the vibration and the remaining amount.

11. A data write control method comprising:
executing control to write a sector data block to a predetermined sector in a track on a magnetic disk in which data is recorded in sector units;
executing control to retry a write process to a predetermined number of sectors to which data has been written and which include a first sector according to an error in a write of a first sector data block to the first sector;
managing a number of retries performed on each sector;
detecting a first temporary defective sector based on the number of retries performed on each sector, and excluding the first temporary defective sector from a target for the write process;
executing control to rewrite a plurality of sector data blocks that have been requested for rewriting to a plurality of sectors according to a rewrite instruction, and
managing the first temporary defective sector as a first normal sector, and recovering the first normal sector to the target for the write process when a rewrite to the first temporary defective sector is completed without an error, and managing a number of rewrites to the first temporary defective sector with errors.

12. The method of claim 11, further comprising executing control to write the sector data block to a plurality of data tracks in such a manner that adjacent data tracks partly overlap.

13. The method of claim 11, further comprising excluding the first temporary defective sector from the target for the write process and a target for the rewrite process based on the number of errors in the rewrite of the first temporary defective sector.

14. The method of claim 11, further comprising:
detecting a normal sector in a plurality of sectors based on the number of retries performed on each sector, and executing control to resume the write process of writing an unrecorded sector data block to the normal sector succeeding the first temporary defective sector;
executing control to write a plurality of data blocks to the normal sector included in the plurality of sectors and a slip spare sector included in a first spare area succeeding the plurality of sectors; and
executing control to write a second sector data block which is to be written to a second temporary defective sector to a non-slip spare sector included in a second spare area according to detection of the second temporary defective sector in the plurality of sectors after exhaustion of the slip spare sector.

* * * * *